United States Patent
Rehwald et al.

(10) Patent No.: US 12,474,427 B2
(45) Date of Patent: Nov. 18, 2025

(54) SELECTION OF K-SPACE DATA SEGMENTS BASED ON ASSOCIATED NAVIGATOR IMAGES

(71) Applicants: Siemens Healthineers AG, Forchheim (DE); Duke University, Durham, NC (US)

(72) Inventors: Wolfgang Rehwald, Chapel Hill, NC (US); Raymond J. Kim, Chapel Hill, NC (US)

(73) Assignees: Siemens Healthineers AG, Forchheim (DE); Duke University, Durham, NC (US)

( * ) Notice: Subject to any disclaimer, the term of this patent is extended or adjusted under 35 U.S.C. 154(b) by 320 days.

(21) Appl. No.: 18/463,394

(22) Filed: Sep. 8, 2023

(65) Prior Publication Data

US 2024/0385273 A1    Nov. 21, 2024

Related U.S. Application Data

(60) Provisional application No. 63/502,974, filed on May 18, 2023.

(51) Int. Cl.
  *G01R 33/567* (2006.01)
(52) U.S. Cl.
  CPC ..... *G01R 33/5676* (2013.01); *G01R 33/5673* (2013.01)
(58) Field of Classification Search
  CPC . A61B 2090/374; A61B 5/0044; A61B 5/055; A61B 5/7207; A61B 5/7285;
  (Continued)

(56) References Cited

U.S. PATENT DOCUMENTS

| | | | |
|---|---|---|---|
| 2019/0317172 A1* | 10/2019 | Botnar | G01R 33/5676 |
| 2021/0325500 A1* | 10/2021 | Uhlemann | G01R 33/56325 |
| 2025/0264560 A1* | 8/2025 | Beck | G01R 33/4824 |

FOREIGN PATENT DOCUMENTS

GB    2582338 A  *  9/2020  ............. A61B 5/055

OTHER PUBLICATIONS

Ehman, R.L. and J.P. Felmlee, "Adaptive technique for high-definition MR imaging of moving structures", Radiology, 1989, vol. 173(1): p. 255-263, 9 total pages).

(Continued)

*Primary Examiner* — Steven L Yeninas

(57) ABSTRACT

A system and method comprises acquisition of a plurality of navigator k-space data segments and a k-space data segment associated with each of the plurality of navigator k-space data segments, generation of a respective navigator image from each of the plurality of navigator k-space data segments, determination, based on the respective navigator images of each of the plurality of navigator k-space data segments, of a first center navigator k-space data segment associated with a most common respiratory position of a subject, determination of a center k-space data segment corresponding to the first center navigator k-space data segment, determination, for each non-center segment of k-space, of a k-space data segment whose respective navigator image is most similar to a first center navigator image generated from the first center navigator k-space data segment, and generation of an image based on the determined k-space data segments.

20 Claims, 15 Drawing Sheets

(58) Field of Classification Search
CPC ............ G01R 33/4818; G01R 33/5608; G01R 33/56509; G01R 33/5676
See application file for complete search history.

(56) References Cited

OTHER PUBLICATIONS

Milotta, G., et al., "3D whole-heart grey-blood late gadolinium enhancement cardiovascular magnetic resonance imaging", Journal of Cardiovasc Magnetic Resonance, 2021, 23(62), https://doi.org/10.1186/s12968-021-00751-2, (pp. 1-14, 14 total pages).

Munoz, C., et al., "Motion corrected water/fat whole-heart coronary MR angiography with 100% respiratory efficiency", Magn Reson Med, 2019. 82(2): p. 732-742.

Munoz, C., et al., "Evaluation of accelerated motion-compensated 3d water/fat late gadolinium enhanced MR for atrial wall imaging", MAGMA, 2021. 34(6), (pp. 877-887, 11 total pages).

Bonanno, G., et al., "Self-navigation with compressed sensing for 2D translational motion correction in free-breathing coronary MRI: a feasibility study", PLoS One, 2014. 9(8): p. e105523.

Coristine, A.J., et al., "Improved respiratory self-navigation for 3D radial acquisitions through the use of a pencil-beam 2D-T(2)-prep for free-breathing, whole-heart coronary MRA", Magn Reson Med, 2018. 79(3): p. 1293-1303.

Stehning, C., et al., "Free-breathing whole-heart coronary MRA with 3D radial SSFP and self-navigated image reconstruction", Magn Reson Med, 2005. 54(2), DOI: 10.1002/mrm.20557, p. 476-80.

Kellman, P., et al., Motion-corrected free-breathing delayed enhancement imaging of myocardial infarction. Magn Reson Med, 2005. 53(1), DOI: 10.1002/mrm.20333, p. 194-200.

* cited by examiner

SELECTION OF K-SPACE DATA SEGMENTS BASED ON ASSOCIATED NAVIGATOR IMAGES

CROSS-REFERENCE TO RELATED APPLICATIONS

This application claims priority to U.S. Provisional Patent Application No. 63/502,974, filed May 18, 2023, the disclosure of which is incorporated herein by reference for all purposes.

BACKGROUND

A Magnetic Resonance (MR) scanner generates images of patient anatomy using timed sequences of RF pulses. MR imaging is useful in scenarios requiring high contrast between different soft tissues. For example, cardiac MR (CMR) imaging is increasingly used to non-invasively evaluate myocardial structure and function without using the ionizing radiation which is required by other imaging modalities.

MR imaging includes the acquisition of k-space data. An image may be calculated from acquired k-space data using a two-dimensional Fourier Transform (FT). Different regions of k-space represent different image properties. For example, the center region of k-space contains image brightness and contrast information, and the edges of k-space contain image sharpness and detail information. A low-resolution image may therefore be calculated using only k-space data from the center region of k-space. A high-resolution image typically requires k-space data from all of k-space.

The amount of k-space data required for a high-resolution image is more than can be acquired in a single data readout (i.e., shot), especially in the case of images of moving structures such as the heart. An image produced from the k-space data acquired by a single shot (even if the data were from the center region of k-space) would exhibit poor temporal resolution, and intricate cardiac features would appear blurred. Therefore, generation of a high-resolution image requires acquisition of k-space data using multiple shots, where each shot is taken with precise temporal resolution (i.e., in the same cardiac phase but in a different heartbeat). Each of the multiple shots acquires a different subset of all the lines of k-space.

An MR sequence may acquire all the lines of k-space by acquiring different segments of k-space using separate shots. FIG. 1A illustrates segment acquisition according to contiguous reordering. As shown, each shot acquires a set or segment of L contiguous phase encoding (PE) lines, such that two segments from consecutive shots share one border in k-space. Segment 1, including PE lines 1 through l, is acquired in a first shot. A second shot acquires segment 2, which includes PE lines l+1 to 2l. Assuming a k-space consisting of N*L lines, the process continues in the PE direction until N segments are acquired.

In CMR, each acquisition a sequence is typically triggered from the R-wave of the subject's ECG signal so that each segment is acquired in the same cardiac phase, but in a different heartbeat. Preferably, the N segments of k-space are acquired while the subject is holding their breath. If the breath is not held, the sequence results in poor image quality because the N k-space segments are likely not acquired during the same respiratory phase. A thusly-generated image may be fuzzy, inhomogeneous, and/or include motion-related ghosting artifacts.

Subjects often cannot hold their breath for more than six seconds, particularly in the case of a subject experiencing cardiac and/or pulmonary disease. This time constraint limits the amount of k-space data that can be acquired during a single breath hold and can lead to two-dimensional images exhibiting poor signal-to-noise ratio (SNR), poor spatial resolution and/or poor temporal resolution. This constraint practically excludes the acquisition of three-dimensional MR images while breath holding.

Systems are desired to efficiently generate high-quality images using k-space data acquired during free breathing.

DETAILED DESCRIPTION

Figure 1A:
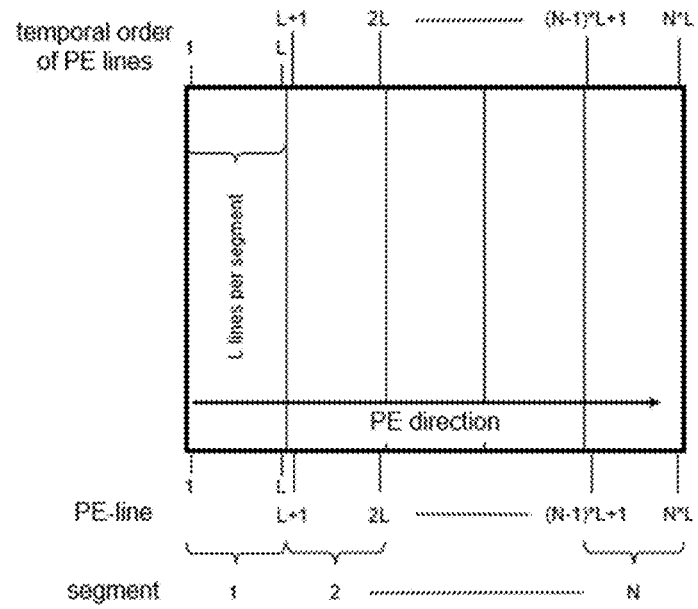
FIG. 1A illustrates contiguous reordering of k-space data.

The following description is provided to enable any person in the art to make and use the described embodiments. Various modifications will remain apparent to those in the art.

Some embodiments provide high-quality images using k-space data acquired during free breathing. Briefly, a free-breathing navigator pulse sequence is executed to acquire segmented k-space data and, in close temporal proximity, associated navigator k-space data. A "most common" respiratory position is determined based on navigator images generated from the navigator k-space data, and k-space data segments which correspond to that position are identified. A high-quality image may then be generated based on the identified data segments.

The most common respiratory position may comprise a position in which a region of interest resides for the longest time during a respiratory cycle. Due to the non-linearity of the respiratory cycle, this position is usually not an average of all positions in which the region resides during the cycle.

Embodiments may use a two-step process to determine the most common respiratory position. In the first step, a composite navigator image is determined from all of the navigator images. The composite navigator image may be an average of all of the navigator images. Difference images between each navigator image and the composite navigator image are then calculated. Each difference image is reduced to a single difference value, for example by summing up the absolute values of their constituent pixels. A histogram of these difference values is plotted with respect to several bins. The bin with the highest peak is identified, representing a first and coarse approximation of the most common respiratory position.

In the second step, the navigator images whose difference values reside in the identified bin are identified. A second composite image is determined based on these navigator images, again for example by averaging this identified subset of navigator images. A second difference value is determined as described above for each of the original navigator images based on the second composite image The second difference values are plotted in a second histogram, and a bin with highest peak is identified. The second difference values within this bin are determined to represent the most common respiratory position.

A k-space data segment is identified which includes the center of k-space and which was acquired contemporaneously with the navigator k-space data of a navigator image whose second difference values are closest to the identified bin. This center k-space data segment is determined out of a plurality of center k-space data segments to have been acquired while the subject was at or closest to the most common respiratory position. The other (i.e., "side") data segments may then be identified by comparing their corresponding navigator images to the navigator image corresponding to the center k-space data segment.

The identified k-space data segments may be motion-corrected in some embodiments. Since the identified k-space data segments represent substantially the same respiratory position, only a minimal amount of motion correction is needed. In some embodiments, an image is generated from the zero-filled k-space of each identified data segment, a different non-rigid motion correction is applied to each image, and the motion-corrected images are combined along with a non-motion-corrected image of the center k-space data segment. This implementation advantageously allows the use of non-rigid motion correction in image space, as opposed to the rigid motion correction typically performed in k-space.

Embodiments may address the problem of poor free breathing image quality in MR, and specifically in CMR. Embodiments may advantageously assess respiratory motion in the image plane. Embodiments may apply to any k-space trajectory, e.g., cartesian, radial, or elliptical, as well as to any reordering scheme used for acquiring the navigator k-space data or the segmented k-space data. Moreover, precision is increased since the navigator k-space data is acquired in the same plane as the segmented k-space data.

Figure 2:
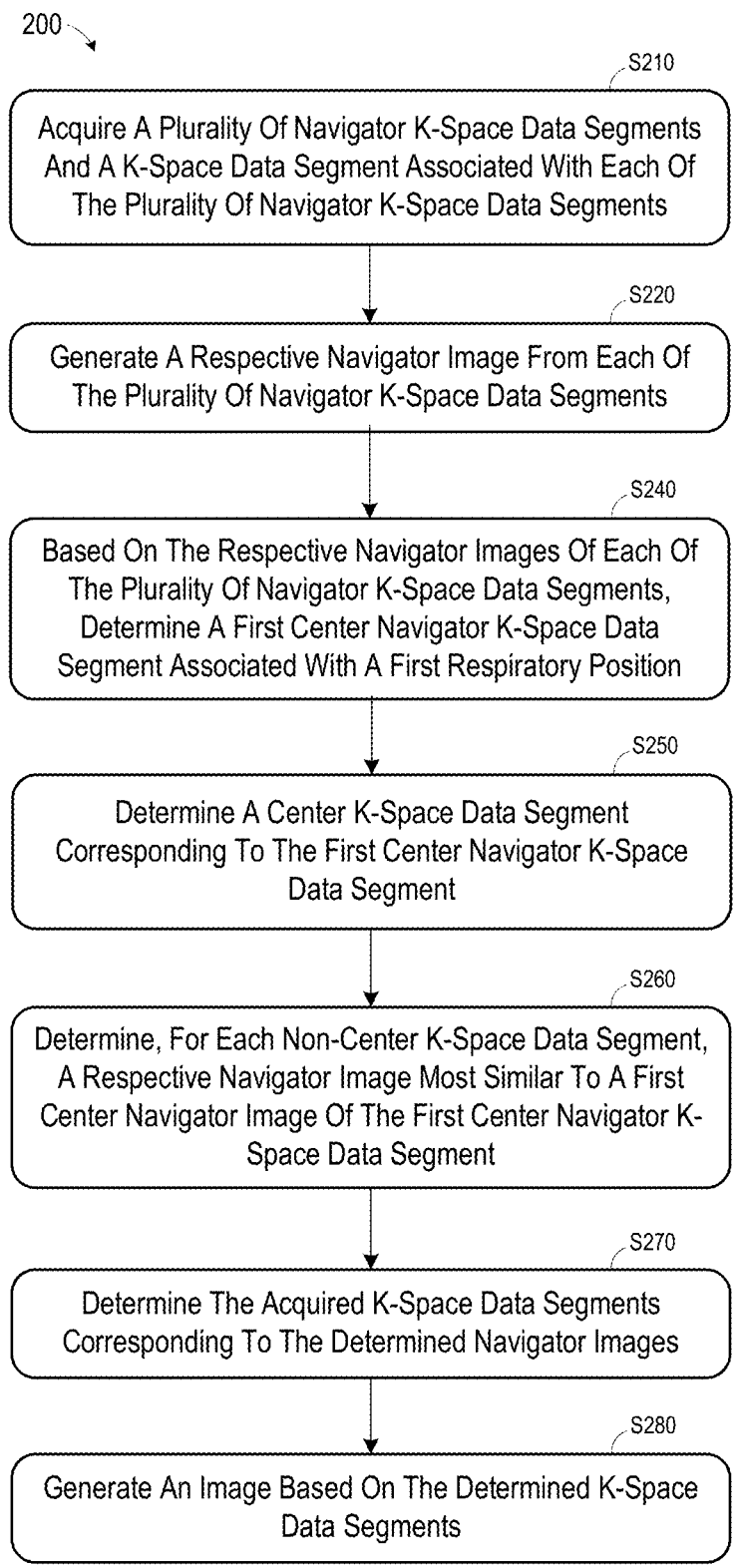
FIG. 2 is a flow diagram of a process to generate an image from k-space data segments according to some embodiments.

FIG. 2 comprises a flow diagram of process 200 to generate an image from k-space data segments according to some embodiments. In some embodiments, various hardware elements of an MRI scanner execute program code to perform process 200. The steps of process 200 need not be performed by a single device or system.

Process 200 and all other processes mentioned herein may be embodied in executable program code read from one or more of non-transitory computer-readable media, such as a disk-based or solid-state hard drive, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a plurality of navigator k-space data segments and a k-space data segment associated with each of the plurality of navigator k-space data segments are acquired at S210. The k-space data segments may be acquired by an MR scanner using a suitable pulse sequence.

Figure 3:
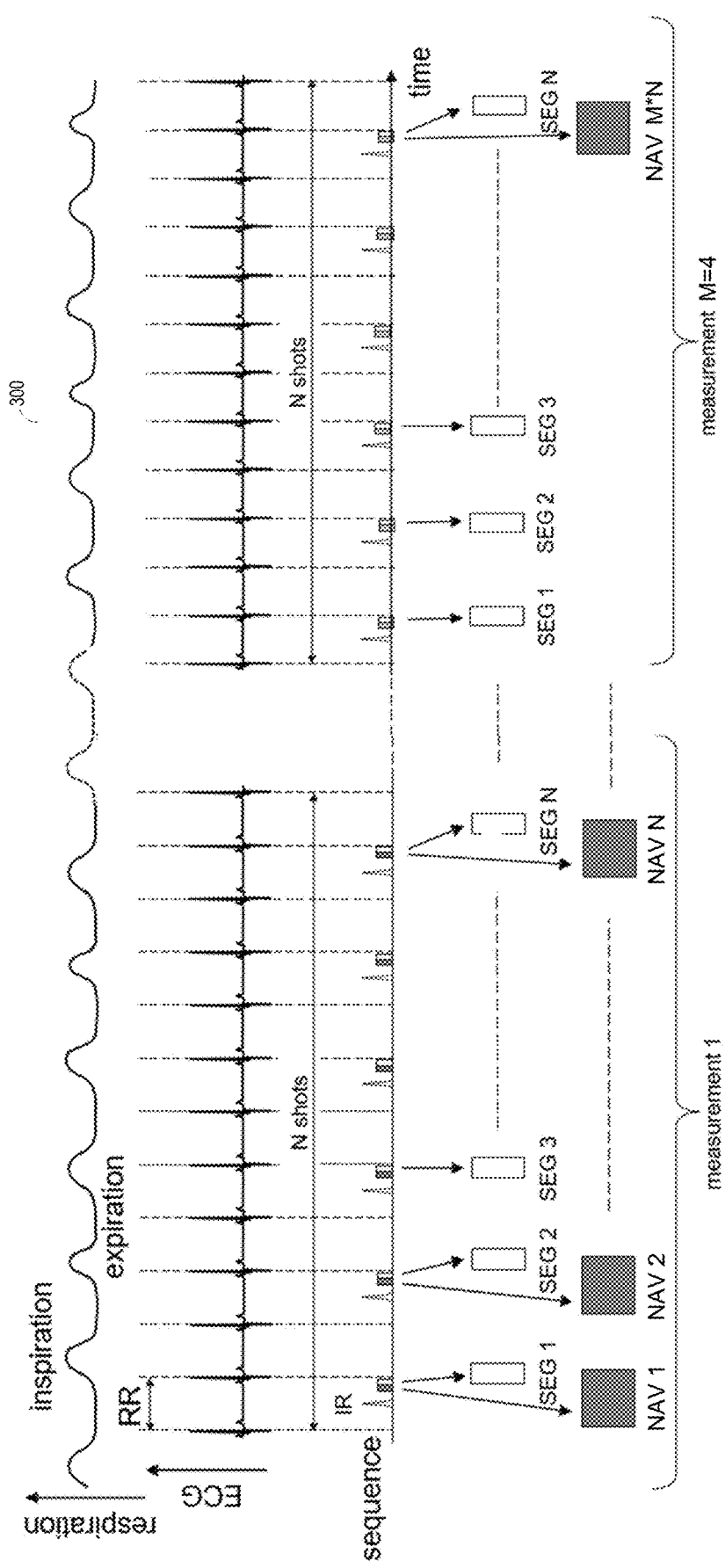
FIG. 3 illustrates an inversion recovery-prepared, segmented pulse sequence with navigator data acquisition according to some embodiments.

FIG. 3 illustrates a segmented CMR pulse sequence that may be used at S210 in some embodiments. Embodiments are not limited thereto. As illustrated by the depicted respiration signal, the pulse sequence executes while the subject is free breathing.

The FIG. 3 pulse sequence is triggered based on the subject's ECG signal such that all k-space data segments are acquired during the diastolic part of the RR-interval. The acquisition of k-space data segments is not synchronized to the respiratory signal, but only to the ECG signal. Therefore, the respiratory position at which each k-space data segment is acquired is substantially random. It will be assumed that k-space consists of N segments, including one center segment and N−1 side segments. In the present example, the sequence is repeated so that each of k-space data segments SEG 1 to SEG N is acquired M=4 times.

Figure 1B:
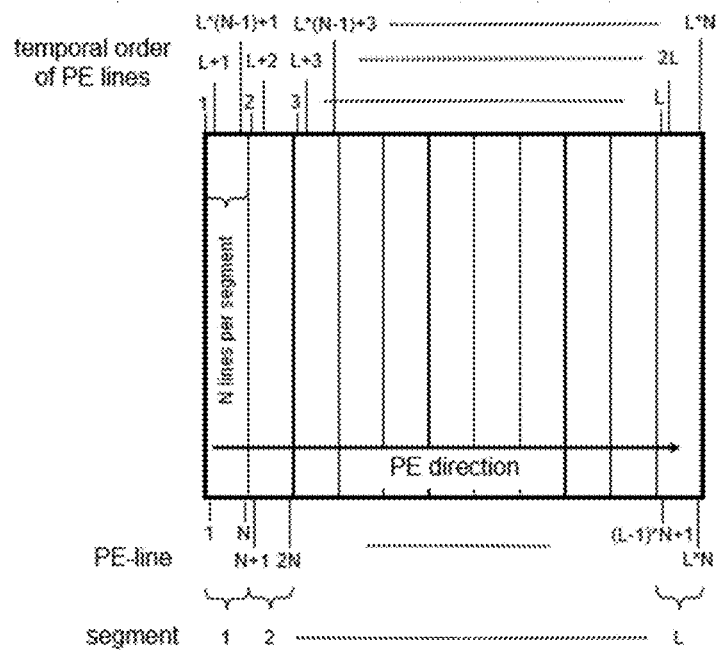
FIG. 1B illustrates interleaved reordering of k-space data.

The N segments SEG 1 to SEG N may be acquired in continuous order as described with respect to FIG. 1A, but any acquisition order (e.g., partially reversed reordering, interleaved reordering) may be used. Interleaved reordering, illustrated in FIG. 1B, refers to the acquisition of a segment of L lines per shot which do not correspond to a single contiguous region in the PE direction but are instead spaced apart from one another. Assuming a k-space consisting of N*L lines, the L lines of an interleaved-reordered segment in are spaced at a distance of N lines from one another. Accordingly, the entire k-space is traversed in the PE direction by each shot but only L lines out of the total N*L lines are acquired by each shot. After N shots, all N*L lines have been acquired.

A navigator k-space data segment is acquired in close temporal proximity to acquisition of each acquired k-space data segment SEG 1 to SEG N. Each navigator k-space data segment and each acquired k-space data segment SEG 1 to SEG N may include a same number of lines, but each navigator k-space data segment includes the same k-space lines, typically located at and near the center of k-space.

The navigator k-space data segments will be used to generate navigator images which depict a position reference and facilitate assessment of a subject's respiratory position during which a corresponding one of k-space data segments SEG 1 to SEG N was acquired. Accordingly, although FIG. 3 depicts acquisition of a navigator k-space data segment immediately before its corresponding k-space data segment, in some embodiments a navigator k-space data segment is acquired immediately after acquisition of its corresponding k-space data segment.

Figure 4:
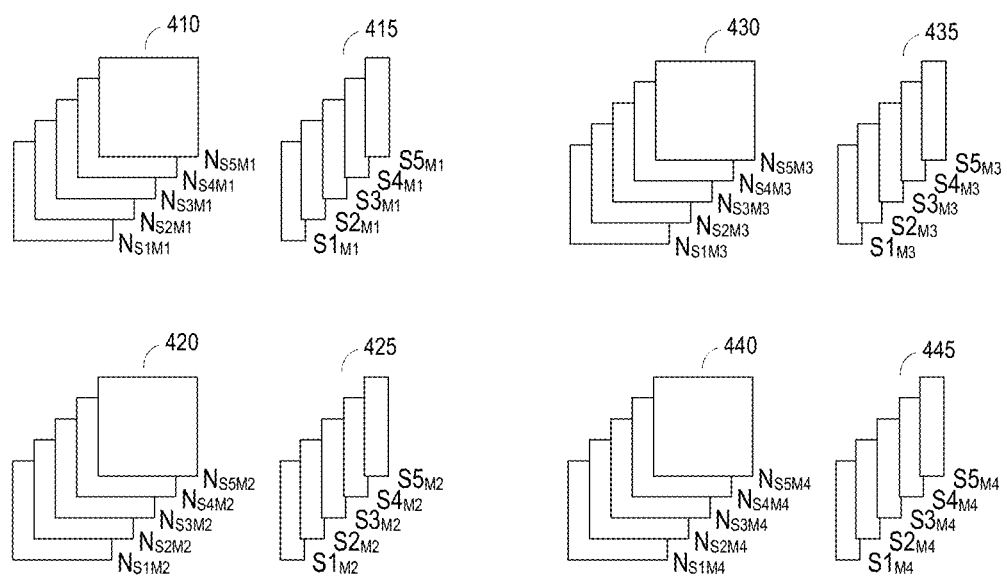
FIG. 4 illustrates acquired navigator k-space data segments and corresponding k-space data segments according to some embodiments.

FIG. 4 illustrates acquired navigator k-space data segments and corresponding k-space data segments according to some embodiments. According to the FIG. 4 example, N=5 and M=4. Thus, the pulse sequence was executed in order to acquire each of the five segments S1-S5 four times. More particularly, navigator k-space data segments 410 and corresponding k-space data segments 415 were acquired during a first repetition (M1), navigator k-space data segments 420 and corresponding k-space data segments 425 were acquired during a second repetition (M2), navigator k-space data segments 430 and corresponding k-space data segments 435 were acquired during a third repetition (M3), and navigator k-space data segments 440 and corresponding k-space data segments 445 were acquired during a fourth repetition (M4). The subscript associated with each navigator k-space data segment $N_{S\#M\#}$ indicates the k-space data segment to which it corresponds. For example, navigator k-space data segment $N_{S2M4}$ corresponds to (i.e., was acquired contemporaneously with) k-space data segment $S2_{M4}$.

S210 may comprise acquisition of the k-space data segments by an MR scanner, or acquisition of previously MR scanner-acquired k-space data segments by a separate computing system. Moreover, S220-S270 may be executed by such a separate computing system or by an MR scanner.

At S220, a respective navigator image is generated from each of the plurality of navigator k-space data segments. A Fast Fourier Transform (FFT) may be applied to a navigator k-space data segment to generate a respective navigator image as is known in the art. With respect to FIG. 3, S220 may include application of a FFT to each navigator k-space data segment (i.e., NAV 1 through NAV 4) acquired during each of the four repetitions of the pulse sequence. Because the navigator k-space data segments include only a limited number of k-space lines (e.g., 25), navigator images generated therefrom are of lower spatial resolution in the phase encoding direction than images generated from a complete set of k-space lines.

A first center navigator k-space data segment associated with a first respiratory position is determined at S240 based on the respective navigator images of each of the plurality of navigator k-space data segments. The first respiratory position may be the most common respiratory position according to some embodiments. Next, at S250, a center k-space data segment associated with the first center navigator k-space data segment is determined.

Figure 5:
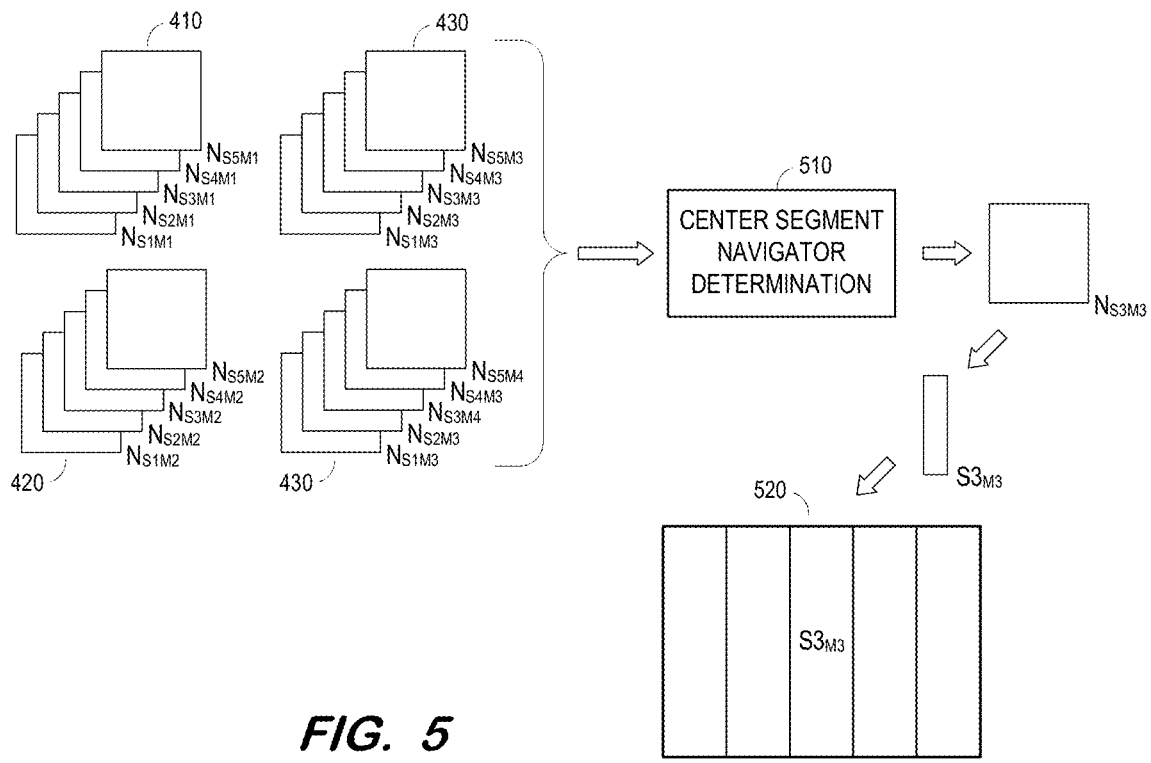
FIG. 5 illustrates determination of a center k-space data segment associated with a common respiratory position according to some embodiments.

FIG. 5 illustrates S220, S240 and S250 according to some embodiments. First, acquired navigator k-space data segments 410-440 are input to center segment navigator determination component 510. Each component described herein may be embodied in hardware and/or executable program code, and two or more components may be embodied by the same hardware and/or executable program code.

Center segment navigator determination component 510 may generate a respective navigator image from each of navigator k-space data segments 410-440 at S220. Component 510 then operates to determine a first center navigator k-space data segment associated with a first respiratory position based on the respective navigator images of navigator k-space data segments 410-440 at S240. Specific details of the determination at S240 according to various embodiments will be described below.

In the FIG. 5 example, navigator k-space data segment $N_{S3M3}$ is determined as the first center navigator k-space data segment at S240. Since k-space data segment $S3_{M3}$ corresponds to navigator k-space data segment $N_{S3M3}$, k-space data segment $S3_{M3}$ is determined as the center k-space data segment at S250. FIG. 5 further illustrates the association of k-space data segment $S3_{M3}$ with the center lines of cumulative k-space 520.

For each non-center k-space data segment, a respective navigator image most similar to a first center navigator image generated from the first center navigator k-space data segment is determined at S260. The similarity may be determined by, for each non-center k-space data segment, calculating the difference navigator image between each respective non-center navigator image and the first center navigator image, then summing the absolute pixel values of each respective difference navigator image, and comparing these sums. According to some embodiments, only the absolute values of the pixels of each difference navigator image within a region of interest (e.g., a central image portion including the heart) contribute to the sums. For each non-center k-space data segment, the navigator image whose sum of the absolute pixel values of its difference navigator image is smaller than those of the other non-center navigator images linked to the same k-space segment is deemed to be most similar to the first center navigator image. Next, at S270, the acquired k-space data segments from which the determined navigator images were generated are determined.

Figure 6:
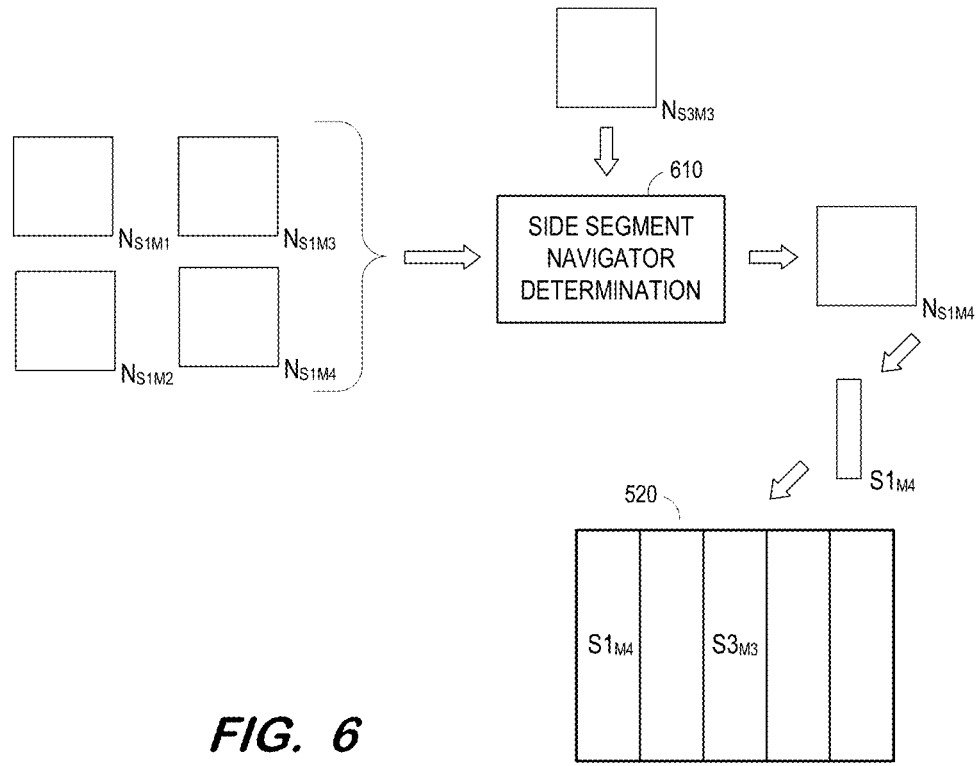
FIG. 6 illustrates determination of a side k-space data segment associated with a common respiratory position according to some embodiments.

FIG. 6 continues the above example in the case of first segment S1, including lines 1 through m of k-space. As shown, side segment navigator determination component 610 receives the navigator k-space data segments corresponding to each of the four k-space data segments including the lines of segment S1. Side segment navigator determination component 610 compares respective navigator images generated from each of the four k-space data segments to the navigator image generated from center navigator k-space data segment $N_{S3M3}$ and determines at S260 that the navigator image generated from navigator k-space data segment $N_{S1M4}$ is most similar to the navigator image generated from center navigator k-space data segment $N_{S3M3}$. At S270, k-space data segment $S1_{M4}$ is determined to correspond to the navigator image generated from navigator k-space data segment $N_{S1M4}$. Accordingly, k-space data segment $S1_{M4}$ is associated with the lines of the first segment of cumulative k-space 520.

Figure 7:
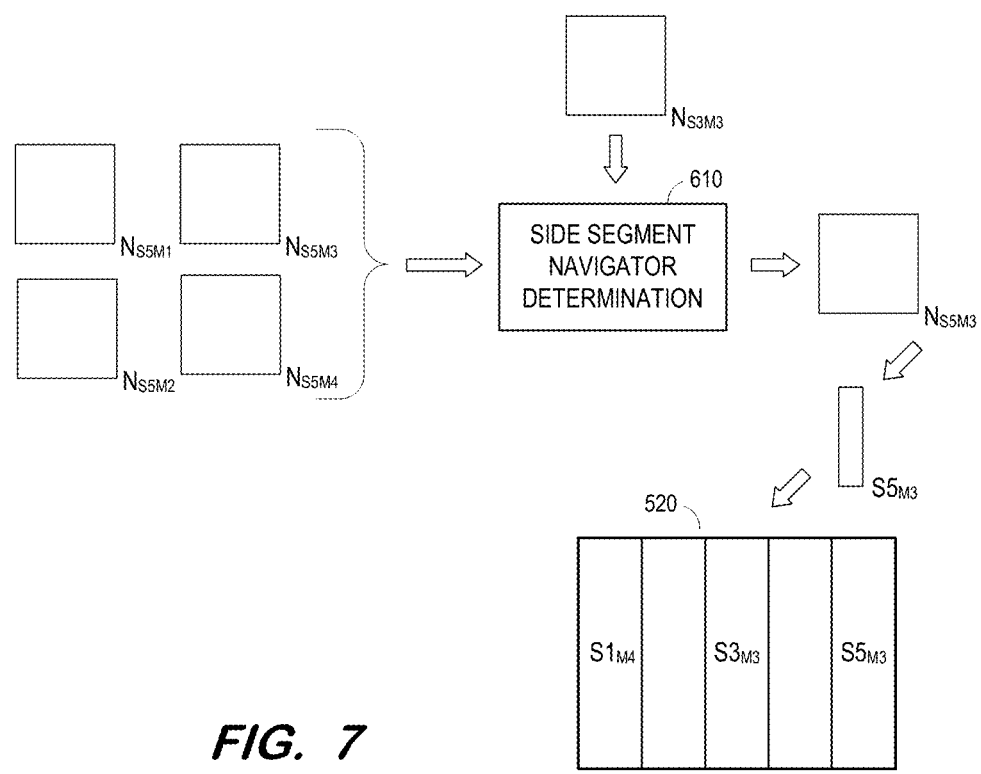
FIG. 7 illustrates determination of a side k-space data segment associated with a common respiratory position according to some embodiments.

FIG. 7 similarly illustrates S260 and S270 with respect to the last segment in the PE direction, denoted herein as segment S5. Side segment navigator determination component 610 receives the navigator k-space data segments corresponding to each of the four navigator k-space data segments including the lines of segment S5. At S260, side segment navigator determination component 610 compares respective navigator images generated from each of the four k-space data segments to the navigator image generated from center navigator k-space data segment $N_{S3M3}$ and determines that the navigator image generated from navigator k-space data segment $N_{S5M3}$ is most similar to the navigator image generated from center navigator k-space data segment $N_{S3M3}$. Component 610 determines that k-space data segment $S5_{M3}$ corresponds to the navigator image generated from navigator k-space data segment $N_{S5M3}$ at S270. K-space data segment $S5_{M3}$ is therefore associated with the lines of segment S5 of cumulative k-space 520.

Figure 8:
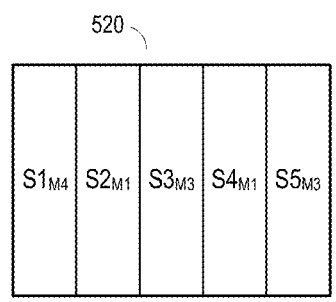
FIG. 8 illustrates determined k-space segments associated with a common respiratory position according to some embodiments.

S260 and S270 are performed for each side (i.e., non-center) k-space data segment, resulting in one k-space data segment being determined for each segment of k-space as shown in FIG. 8. Next, at S280, an image is generated based on the determined k-space data segments. As described above, the image may exhibit high quality despite the acquisition of k-space data segments during free-breathing.

Figure 9A:
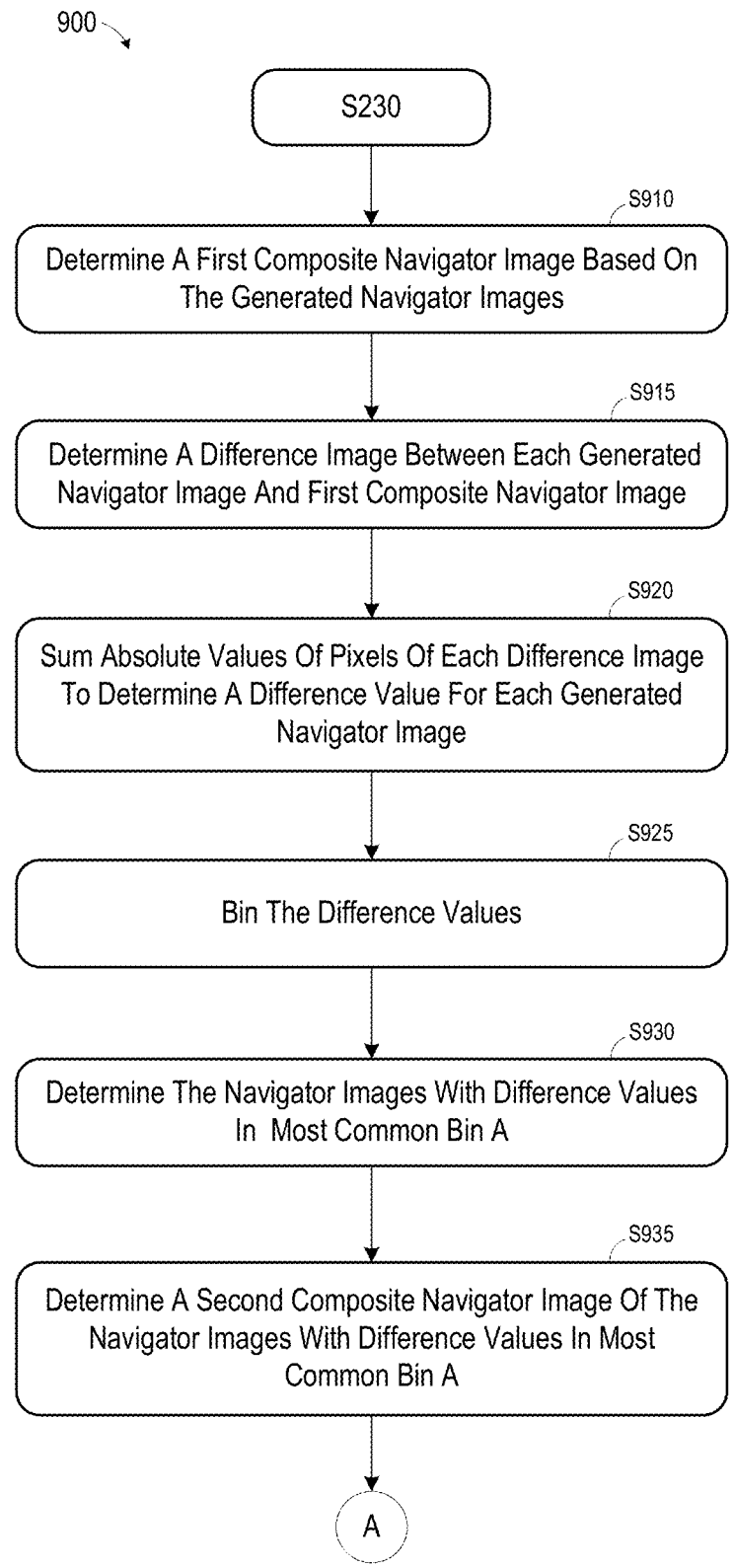
FIGS. 9A and 9B comprise a flow diagram of a process to determine a first center navigator image associated with a common respiratory position based on respective navigator images of each of a plurality of center navigator k-space data segments according to some embodiments.
Figure 9B:
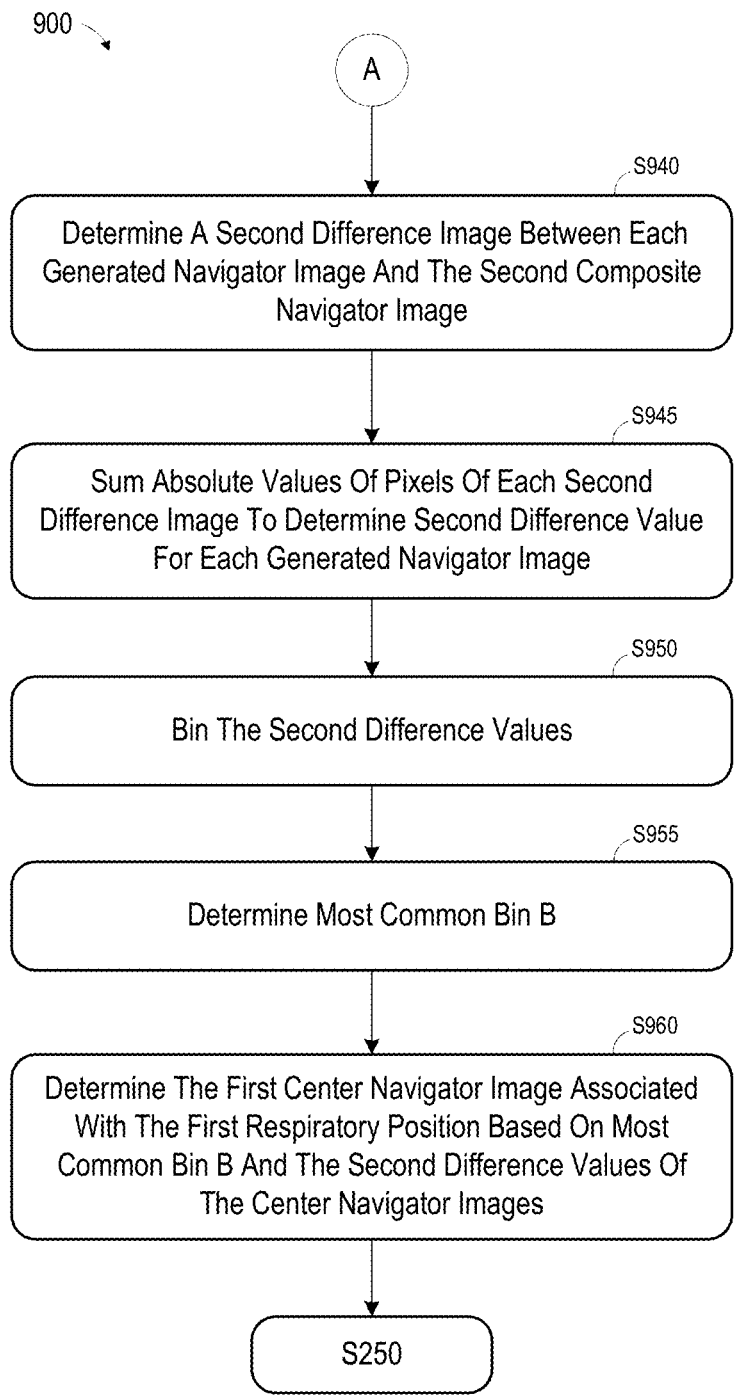

FIGS. 9A and 9B comprise a flow diagram of process 900 to perform S240 according to some embodiments. Process 900 may therefore be executed to determine a first center navigator k-space data segment associated with a most common respiratory position based on respective navigator images generated from each of a plurality of navigator k-space data segments.

Initially, at S910, a first composite navigator image is determined based on the navigator images generated at S220. According to some embodiments, the first composite navigator image is determined by calculating the complex-valued mean of the set of navigator images acquired by each receiver coil. The complex-valued mean images separated by receiver coil may then be combined into a single absolute-valued image by summing, for each pixel, the squares of the complex-valued navigator images of each receiver coil and taking the square root of this sum. In another embodiment, the complex-valued navigator k-space data of all navigator data acquired by each receiver coil is averaged. For each receiver coil, this average is Fourier-transformed into a complex-valued image and these receiver coil images are combined using the above-described root-sum-of-squares process create an absolute-valued first composite navigator image. The first composite navigator image may be determined using any other algorithm which generates a navigator image based on the plurality of navigator images.

Figure 10:
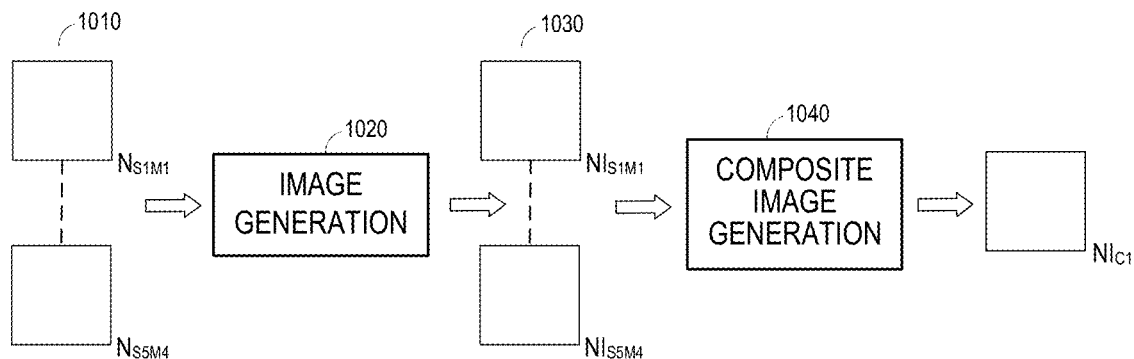
FIG. 10 illustrates generation of a composite navigator image according to some embodiments.

FIG. 10 illustrates generation of a composite navigator image according to some embodiments. Twenty (i.e., N=5, M=4) acquired navigator k-space data segments 1010 are input to image generation component 1020, which generates a respective navigator image (i.e., $NI_{S\#M\#}$) 1030 from each of navigator k-space data segments 1010. Composite image generation component 1040 operates on navigator images 1030 to generate first composite navigator image $NI_{C1}$.

A difference image between each generated navigator image and the first composite navigator image is determined at S915. For example, the first composite navigator image may be subtracted from each generated navigator image to result in a difference image corresponding to each generated navigator image. Next, at S920, the absolute values of the pixels of each difference image are summed to determine a difference value for each generated navigator image. The determined differences are assigned to bins of a histogram at S925.

Figure 11:
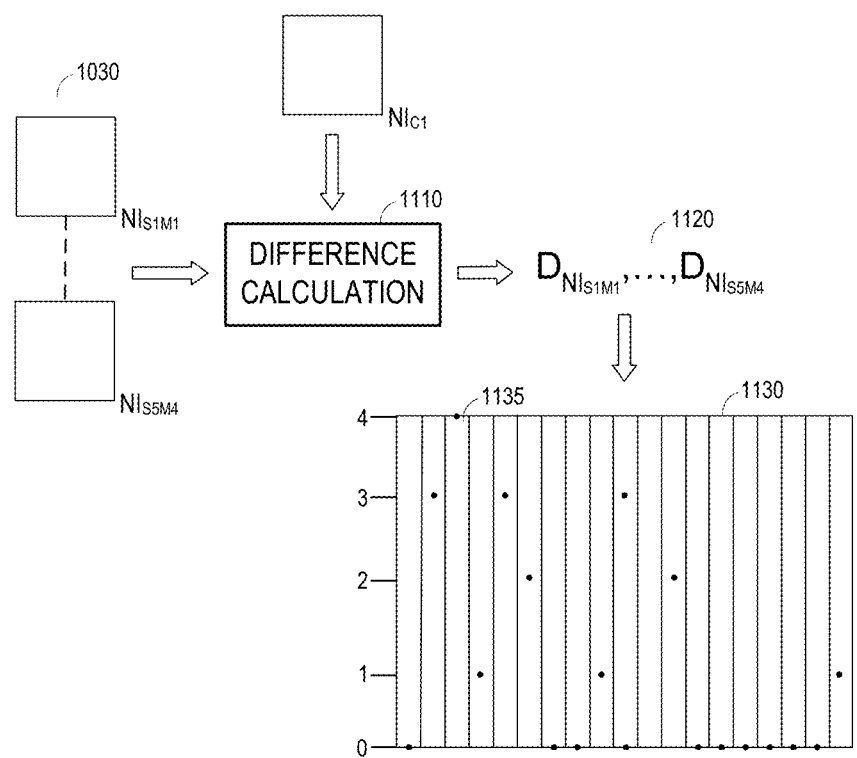
FIG. 11 illustrates determination of a subset of navigator images based on the composite navigator image according to some embodiments.

FIG. 11 illustrates S915-S925 according to some embodiments. Difference calculation component 1110 subtracts first composite navigator image $NI_{C1}$ from each of navigator images 1030 to generate a difference image (not shown) corresponding to each navigator image 1030. Difference calculation component 1110 then sums the absolute values of the pixels of each difference image to determine a difference value D 1120 for each navigator image 1030.

FIG. 11 also shows histogram 1130 including nineteen bins. Each bin represents an exclusive range of difference values. After S925, each bin maintains a count (represented by a dot) of the difference values 1120 which fall within the range of the bin. The bin having the highest count after S925 will be referred to as most common bin A.

The navigator images with difference values in most common bin A are determined at S930. In the case of histogram 1130, most common bin A, including four difference values 1120, is bin 1135. This bin may be referred to as the mode bin, and it represents the most-frequent respiratory position relative to the first composite navigator image, which may be the mean navigator image, i.e., the mean respiratory position. The mean respiratory position may be close but not identical to the most common respiratory position because respiratory motion is non-linear. S930 therefore consists of determining the navigator images 1030 whose difference values 1120 are assigned to bin 1135, in this example four navigator images, and consequently better approximate the most common respiratory position. These four navigator images 1030 may be associated with any acquired k-space data segments.

Figure 12:
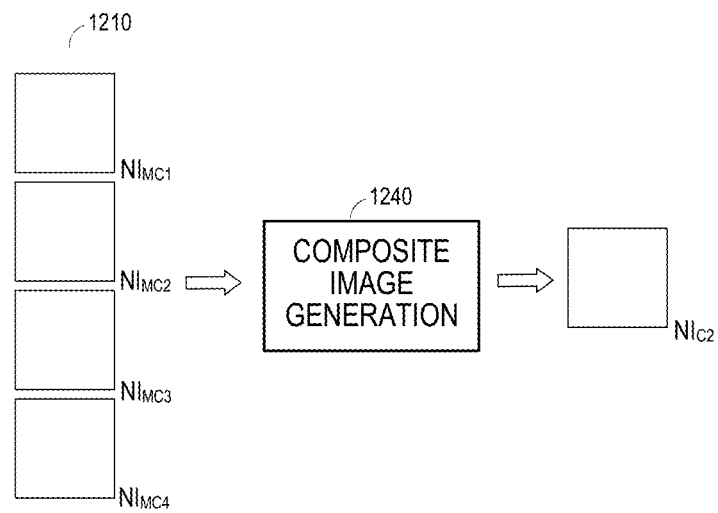
FIG. 12 illustrates generation of a second composite navigator image based on the subset of navigator images according to some embodiments.

A second composite navigator image is determined at S935. The second composite navigator image is determined based on the navigator images having difference values in most common bin A. FIG. 12 shows four navigator images 1210 which were determined at S930 as having difference values in bin 1135. The subscripts of navigator images 1210 do not conform to the above-used numbering convention in order to indicate that the navigator images determined at S930 might be associated with any of the acquired segments.

Composite image generation component 1240 operates on navigator images 1210 at S935 to generate second composite navigator image $NI_{C2}$. Component 1240 may generate second composite navigator image $NI_{C2}$ in the same manner as component 1040 generated first composite navigator image $NI_{C1}$, but embodiments are not limited thereto.

A second difference image between each generated navigator image and the second composite navigator image is determined at S940. The absolute values of the pixels of each of the second difference images are summed to determine a second difference value for each generated navigator image at S945. Next, at S950, the determined differences are assigned to bins of a histogram.

Figure 13:
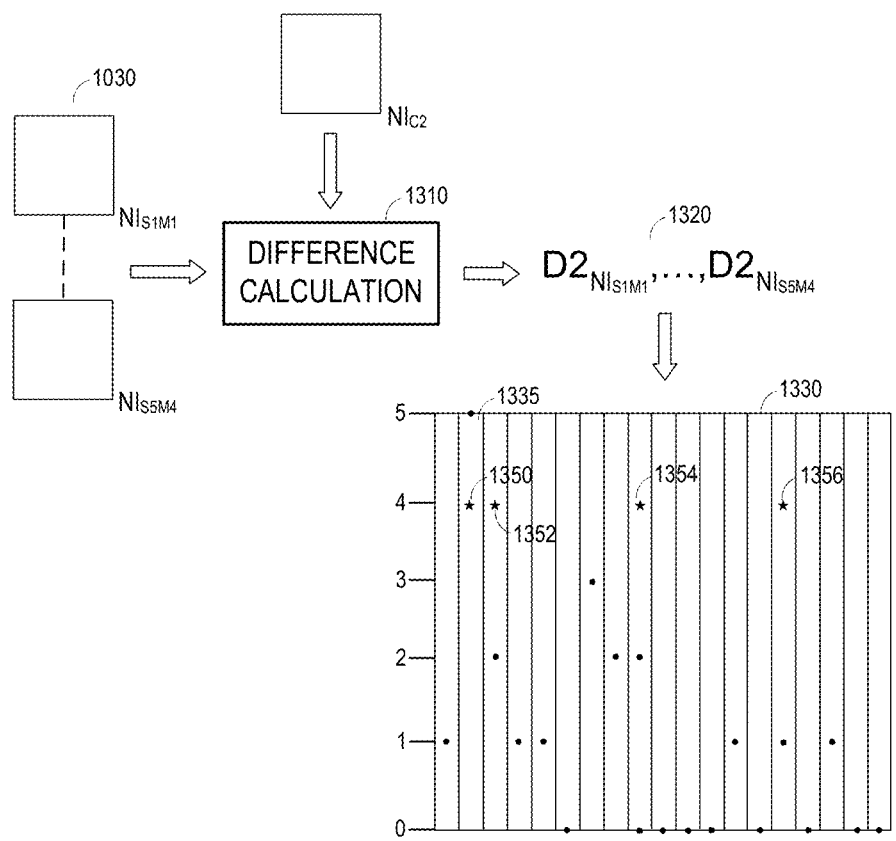
FIG. 13 illustrates determination of a center navigator image based on the second composite navigator image according to some embodiments.

FIG. 13 illustrates S940-S950 according to some embodiments. Difference calculation component 1310 subtracts second composite navigator image $NI_{C2}$ from each of navigator images 1030 to generate a difference image corresponding to each navigator image 1030, and then sums the absolute values of the pixels of each difference image to determine a second difference value D2 1320 for each of navigator images 1030.

Histogram 1330 includes nineteen bins representing exclusive ranges of difference values. Each of difference values 1320 is assigned at S950 to a bin of histogram 1330 whose range includes the difference value. The dot shown within each bin indicates a number of difference values 1320 which fall within the range of the bin.

The most common bin of histogram 1330 (i.e., most common bin B) is determined at S955. According to FIG. 13, bin 1335 is the most common bin of histogram 1330 and includes five difference values 1320. Most common bin B (i.e., bin 1335) may typically correspond to the most common respiratory position to a closer degree than most common bin A (i.e., bin 1135). As in the present example, the number of difference values within most common bin B may be greater than the number of difference values within most common bin A and the range of difference values of most common bin B may be lower in magnitude than the range of difference values of most common bin A, both of which may indicate that most common bin B more accurately reflects the most common respiratory position than most common bin A.

A first center navigator image associated with a first respiratory position is determined based on most common bin B and the second difference values associated with each of the center navigator images at S960. For example, stars 1350-1356 indicate the second difference values corresponding to each of the four center navigator images generated from the four acquired k-space data segments which include the center line of k-space. The first center navigator image determined at S960 is the one of these four center navigator images represented by star 1350 whose second difference value is closest to the center value of most common bin B 1335. Flow then continues to S250 of process 200.

S260 of process 200 involves determination, for each non-center k-space data segment, of a respective navigator image most similar to the first center navigator image. According to some embodiments, such similarity may be determined by calculating the displacement fields between the pixels of each respective navigator image and the pixels of the first center navigator image. Again, the displacement fields may be calculated only between pixels within a region of interest.

Figure 14A:
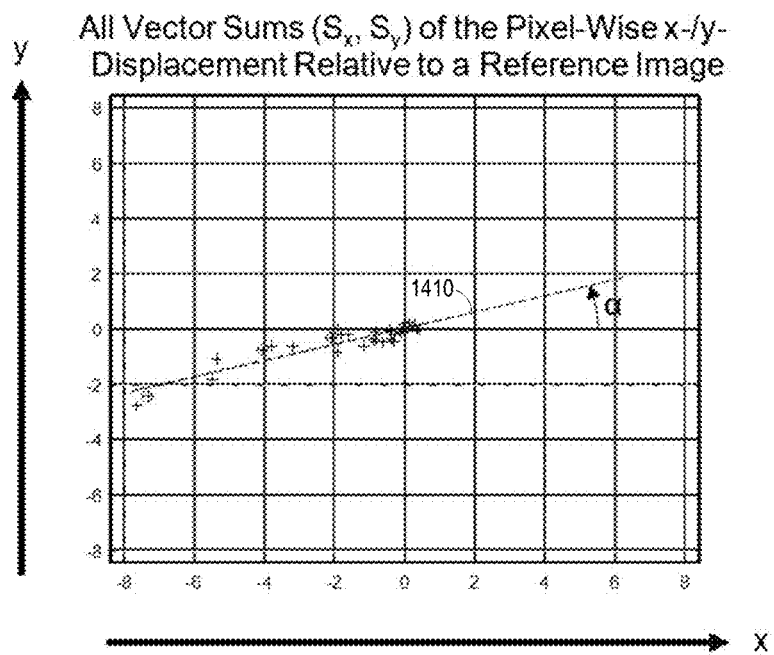
FIGS. 14A and 14B illustrate determination of a displacement value representing a displacement between navigator images and composite navigator images according to some embodiments.

As known in the art, a displacement field represents the displacement of each pixel as a displacement pixel, which is a vector. To create a single value analogous to the "sum of the absolute values of the pixels", all vectors within a displacement field are added to result in a single vector having an x-component and a y-component, such as $(S_x, S_y)$. The procedure is repeated for all navigator images associated with a segment, resulting in one vector $(S_x, S_y)$ per navigator image. FIG. 14A illustrates a plot of these vectors, where crosses indicate a navigator image corresponding to a side segment and circled crosses indicate a navigator image corresponding to a center segment.

Figure 14B:
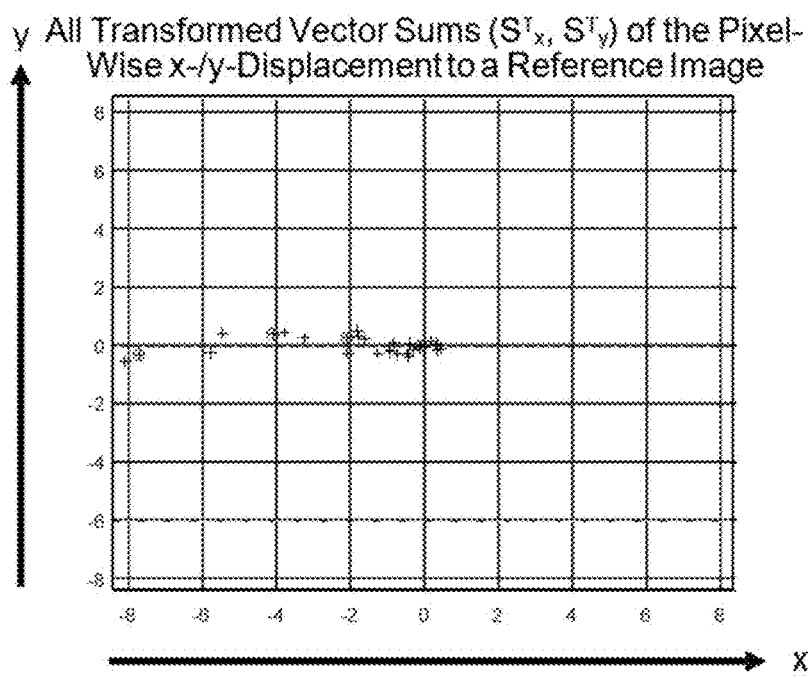

Embodiments may reduce two-dimensional metric of image similarity to a single dimension (akin to a sum of absolute pixel values). First, the main direction of motion is determined by applying a least squares polynomial fit of first order to all vectors $(S_x, S_y)$ to generate straight line 1410. Next, all vectors $(S_x, S_y)$ are rotated about the intersection of line 1410 and the y-axis, by the negative of the angle $\alpha$ between the x-axis and line 1410. This rotation yields transformed vector sums $(S^T_x, S^T_y)$ shown in FIG. 14B. seen in diagram 8011 for which the main motion direction 8015 occurs along the x-axis. The x-component of each transformed vector $(S^T_x, S^T_y)$ is then used to determine the similarity between the navigator image associated with the transformed vector and the first center navigator image, in a manner analogous to the above-described use of the "sum of the absolute pixel values" to determine image similarity.

Unlike a sum of absolute values, the x-component of each transformed vector $(S^T_x, S^T_y)$ may be negative, zero, or positive.

This one-dimensional displacement metric is used instead of the difference values described with respect to process 900. Specifically, S915 and S920 may be replaced with a determination of a one-dimensional displacement metric for each generated navigator image and indicative of displacement between the generated navigator image and the first composite navigator image. Similarly, S940 and S945 may be replaced with a determination of a one-dimensional displacement metric for each generated navigator image and indicative of displacement between the generated navigator image and the second composite navigator image. These one-dimensional displacement metrics may be binned at S925 and S950 as described with respect to the difference values, although the ranges of the bins will differ accordingly.

Figure 15:
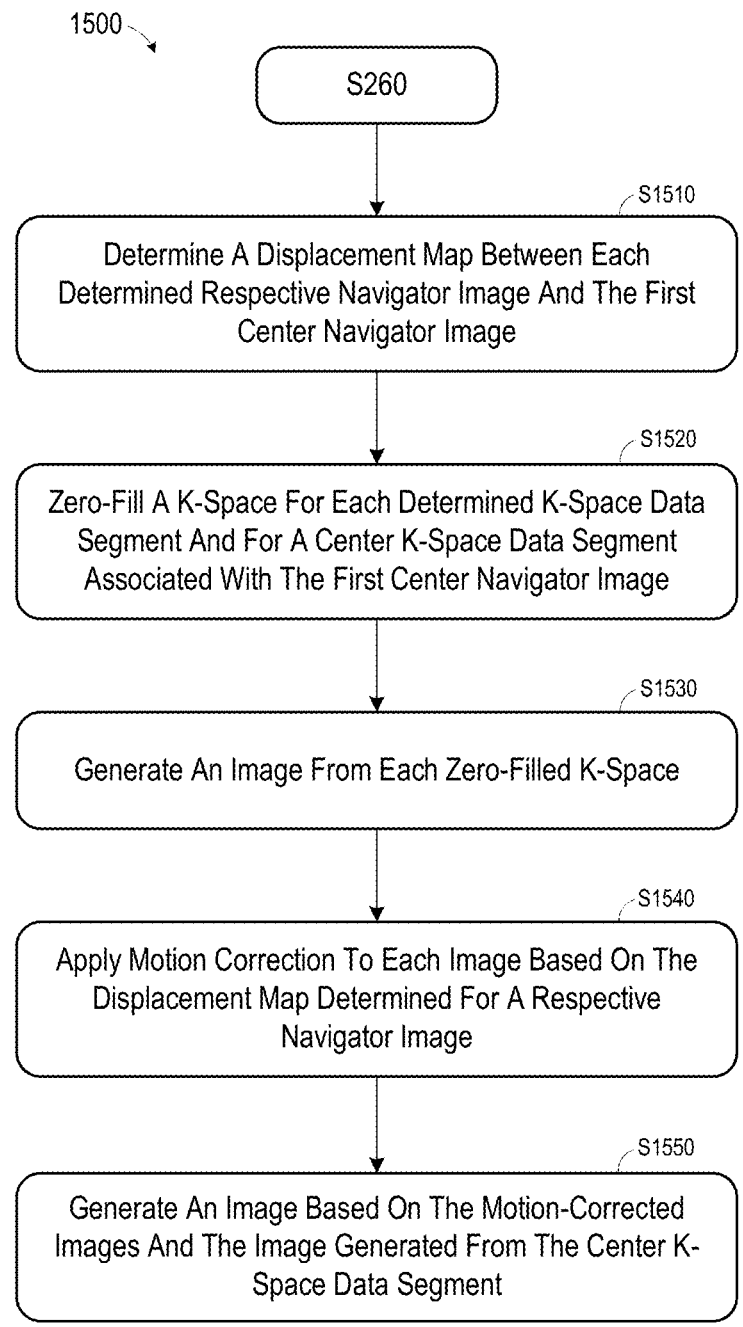
FIG. 15 comprises a flow diagram of a process to generate a motion-corrected image from k-space data segments according to some embodiments.

FIG. 15 is a flow diagram of process 1500 according to some embodiments. Process 1500 may comprise an embodiment of S270 and S280 of process 200. Prior to S1510, S210-S260 may have proceeded according to any of the alternatives mentioned above.

A displacement map between each determined respective navigator image and the first center navigator image is determined at S1510. The displacement maps may be determined as is known in the art, and the determination may ignore image pixels outside a region of interest. Next, at S1520, a k-space is zero-filled for each determined k-space data segment and for a center k-space data segment associated with the first center navigator image. Zero-filling may comprise creating a complete k-space for each data segment, where the lines of the k-space which are not included in the data segment are populated with zero values.

A complex-valued image is generated from each zero-filled k-space data segment at S1530. At S1540, motion correction is applied to each generated image based on the displacement map determined for the navigator image corresponding to the k-space data segment of the generated image.

Figure 16:
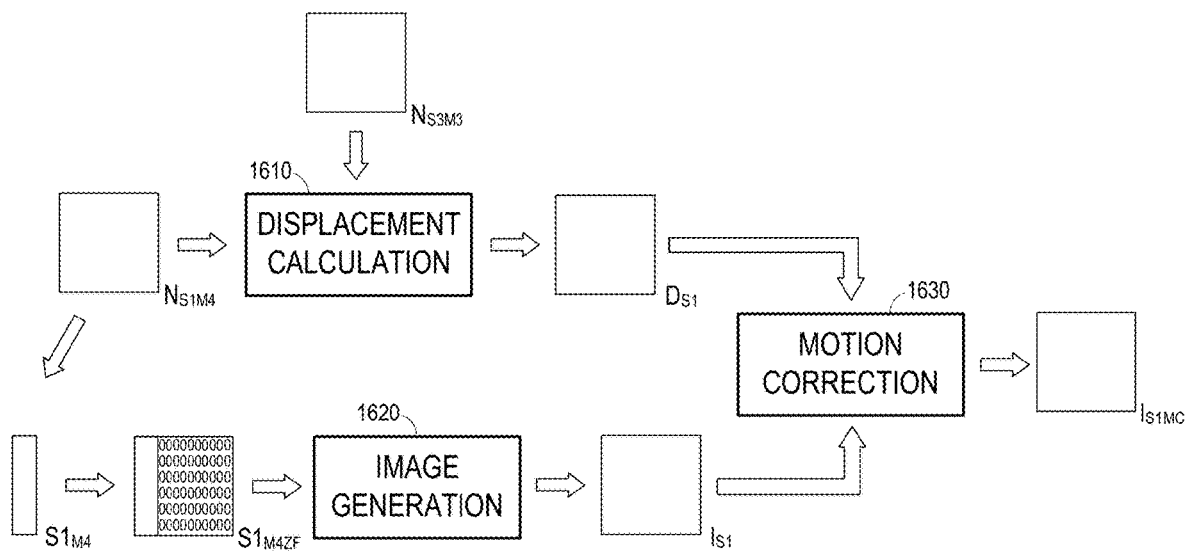
FIG. 16 illustrates generation of a motion-corrected image based on a segment of k-space data according to some embodiments.

FIG. 16 illustrates execution of S1510 to S1540 for a single navigator image according to some embodiments. Displacement calculation component 1610 calculates displacement map $D_{S1}$ between navigator image $N_{S1M4}$ determined at S260 and first center navigator image $N_{S3M3}$ at S1510. K-space $S1_{M4ZF}$ is zero-filled at S1520 except for the k-space data of corresponding k-space data segment $I_{S1M4}$. Next, at S1530, image generation component 1620 generates image $I_{S1}$ from zero-filled k-space $S1_{M4ZF}$, for example using an FFT. Motion correction component 1630 applies motion correction to image $I_{S1}$ based on displacement map $D_{S1}$, which was determined for navigator image $N_{S1M4}$ corresponding to k-space data segment $I_{S1M4}$ of image $I_{S1}$.

Figure 17:
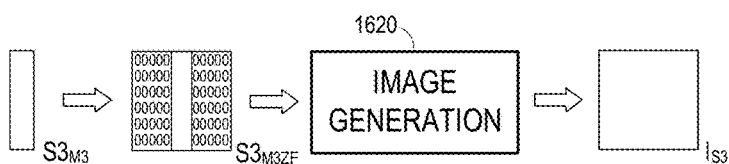
FIG. 17 illustrates generation of an image based on a center segment of k-space data according to some embodiments.

As mentioned, a k-space is zero-filled at S1520 for each determined k-space data segment and for a center k-space data segment associated with the first center navigator image. FIG. 17 illustrates processing of center k-space data segment at S1520 and S1530 according to some embodiments. K-space $S3_{M3ZF}$ is zero-filled at S1520 except for the k-space data of center k-space data segment $S3_{M3}$. Image generation component 1620 then generates image $I_{S3}$ from zero-filled k-space $S3_{M3ZF}$. Image $I_{S3}$ is not subjected to motion correction according to some embodiments.

Continuing with process 1500, a complex-valued image is generated at S1550 based on the motion-corrected complex-valued images and the complex-valued image generated from the center k-space data segment. The complex-valued images may be added together or combined in any other suitable manner. Adding together the motion corrected images to create one final high-quality image is suitable if the images to be motion-corrected are complex-valued, the motion-corrected images are complex-valued, and the image generated from the center k-space data segment is complex-valued.

Figure 18:
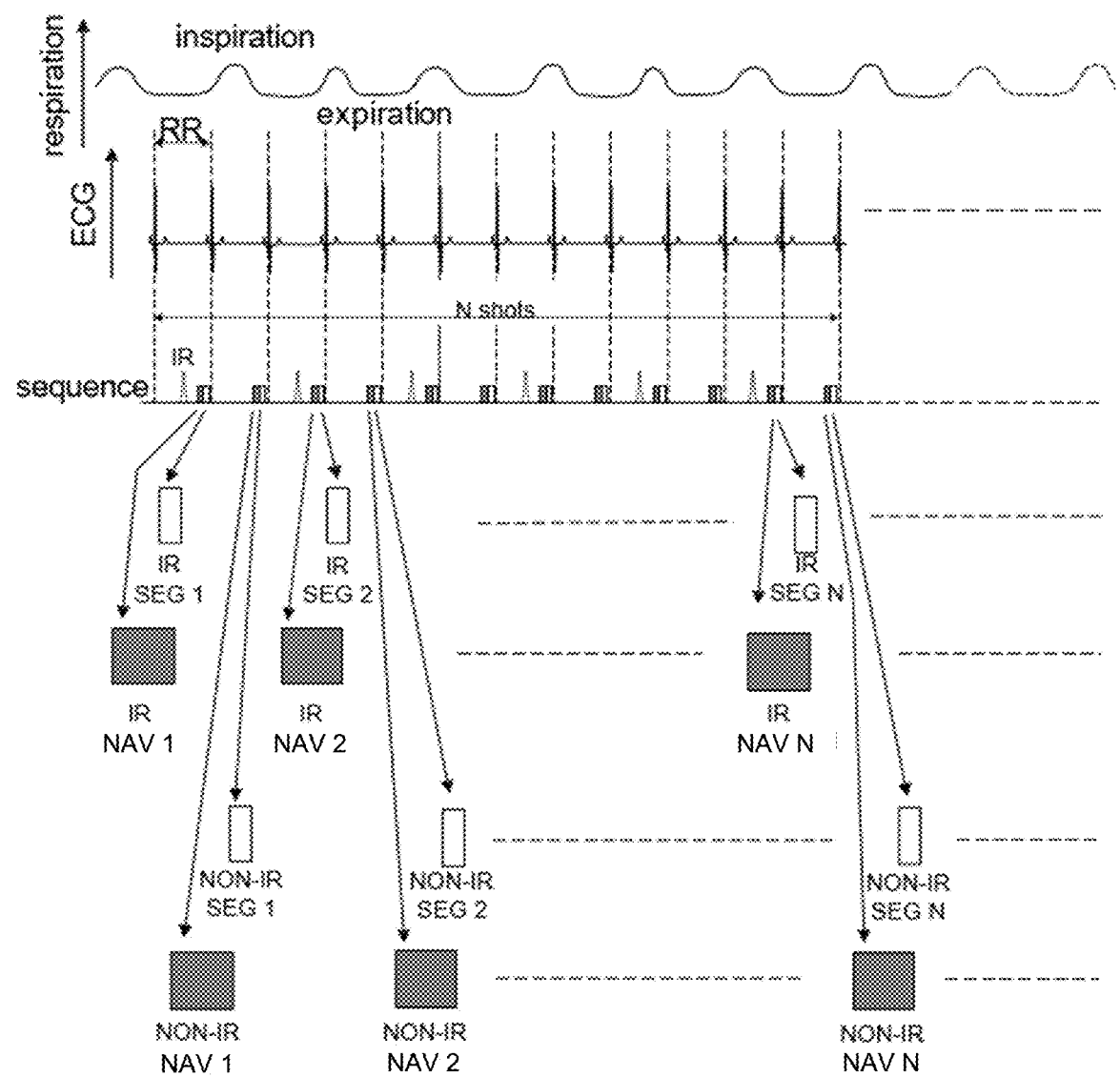
FIG. 18 illustrates a phase-sensitive inversion recovery pulse sequence including the acquisition of navigator data prior to the acquisition of each inversion recovery-prepared data segment and the acquisition of each non-inversion recovery-prepared reference data segment according to some embodiments.
Figure 19:
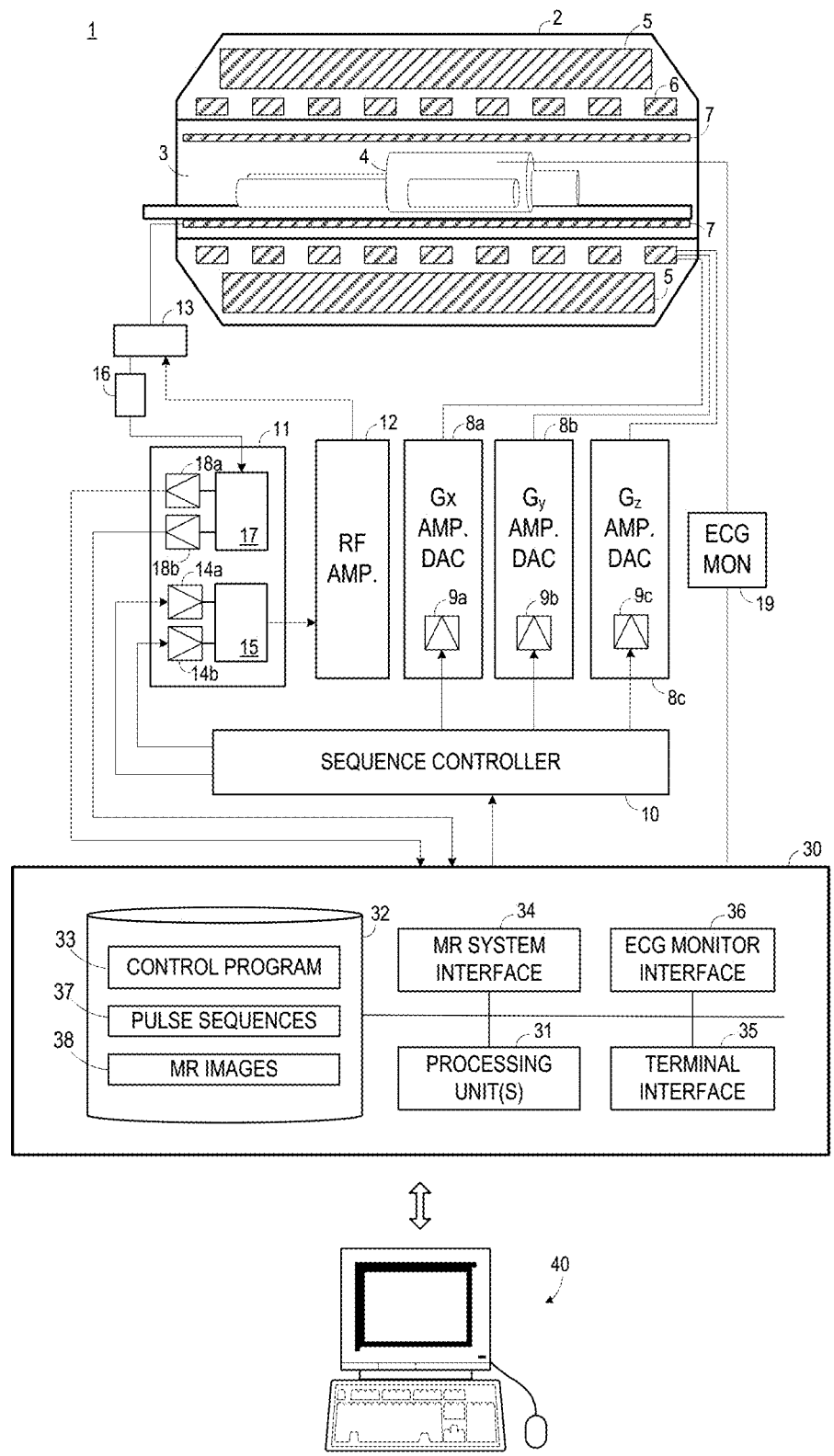
FIG. 19 is a block diagram of an example MR system for use in some embodiments.

FIG. 18 illustrates a Phase-Sensitive Inversion Recovery (PSIR) pulse sequence to acquire IR-prepared k-space data segments (i.e., IR SEG) and corresponding navigator k-space data segments (i.e., IR NAV) according to some embodiments. This sequence is similar to the sequence of FIG. 3 but also comprises the acquisition of PSIR reference data (i.e., non-IR SEG) and associated navigator k-space data segments (i.e., non-IR NAV). The PSIR reference data is acquired during RR-intervals in which no preparatory inversion pulse is played out.

According to some embodiments, the acquired IR-prepared k-space data segments and corresponding navigator k-space data segments are processed using any alternative described above to generate an IR image. Analogously, the acquired non-IR-prepared k-space data segments and corresponding navigator k-space data segments may be processed using any alternative described above to generate a PSIR reference image. The IR image and the PSIR reference image may be passed to a known PSIR reconstruction algorithm to produce a PSIR image. Motion correction may be applied to correct the PSIR reference image relative to the IR image prior to application of the PSIR reconstruction algorithm.

FIG. 20 illustrates MR system 1 according to some embodiments. MR system 1 includes MR chassis 2, which defines bore 3 in which patient 4 is disposed. MR chassis 2 includes polarizing main magnet 5, gradient coils 6 and RF coil 7 arranged about bore 3. According to some embodiments, polarizing main magnet 5 generates a uniform main magnetic field ($B_0$) and RF coil 7 emits an excitation field ($B_1$).

According to MR techniques, a substance (e.g., human tissue) is subjected to a main polarizing magnetic field (i.e., $B_0$), causing the individual magnetic moments of the nuclear spins in the substance to process about the polarizing field in random order at their characteristic Larmor frequency, in an attempt to align with the field. A net magnetic moment $M_z$ is produced in the direction of the polarizing field, and the randomly-oriented magnetic components in the perpendicular plane (the x-y plane) cancel out one another.

The substance is then subjected to an excitation field (i.e., $B_1$) created by emission of a radiofrequency (RF) pulse, which is in the x-y plane and near the Larmor frequency, causing the net aligned magnetic moment $M_z$ to rotate into the x-y plane so as to produce a net transverse magnetic moment $M_t$, which is rotating, or spinning, in the x-y plane at the Larmor frequency. The excitation field is terminated, and signals are emitted by the excited spins as they return to their pre-excitation field state. The emitted signals are detected, digitized and processed to reconstruct an image or a spectrum using one of many well-known MR techniques.

Gradient coils 6 produce magnetic field gradients $G_x$, $G_y$, and $M_z$ which are used for position-encoding NMR signals. The magnetic field gradients $G_x$, $G_y$, and $M_z$ distort the main magnetic field in a predictable way so that the Larmor frequency of nuclei within the main magnetic field varies as a function of position. Accordingly, an excitation field $B_1$ which is near a particular Larmor frequency will tip the net aligned moment $M_z$ of those nuclei located at field positions which correspond to the particular Larmor frequency, and signals will be emitted only by those nuclei after the excitation field $B_1$ is terminated.

Gradient coils 6 may consist of three windings, for example, each of which is supplied with current by an amplifier 8a-8c in order to generate a linear gradient field in its respective Cartesian direction (i.e., x, y, or $M_z$). Each amplifier 8a-8c includes a digital-analog converter 9a-9c which is controlled by a sequence controller 10 to generate desired gradient pulses at prescribed times.

Sequence controller 10 also controls the generation of RF pulses by RF system 11 and RF power amplifier 12. RF system 11 and RF power amplifier 12 are responsive to a scan prescription and direction from sequence controller 10 to produce RF pulses of the desired frequency, phase, and pulse amplitude waveform. The generated RF pulses may be applied to the whole of RF coil 7 or to one or more local coils or coil arrays. RF coil 7 converts the RF pulses emitted by RF power amplifier 12, via multiplexer 13, into a magnetic alternating field in order to excite the nuclei and align the nuclear spins of the object to be examined or the region of the object to be examined. As mentioned above, RF pulses may be emitted in a magnetization preparation step in order to enhance or suppress certain signals.

The RF pulses are represented digitally as complex numbers. Sequence controller 10 supplies these numbers in real and imaginary parts to digital-analog converters 14a-14b in RF system 11 to create corresponding analog pulse sequences. Transmission channel 15 modulates the pulse sequences with a radio-frequency carrier signal having a base frequency corresponding to the resonance frequency of the nuclear spins in the volume to be imaged.

RF coil 7 both emits radio-frequency pulses as described above and scans the alternating field which is produced as a result of processing nuclear spins, i.e., the nuclear spin echo signals. The received signals are received by multiplexer 13, amplified by RF amplifier 16 and demodulated in receiving channel 17 of RF system 11 in a phase-sensitive manner. Analog-digital converters 18a and 18b convert the demodulated signals into digitized real and imaginary components.

Electrocardiograph ("ECG") monitor 19 acquires ECG signals from electrodes placed on patient 4. Such physiological signals may be used by sequence controller 10 to synchronize, or "gate", transmitted RF pulses of a spectroscopy pulse sequence based on the heartbeat of patient 4 as described herein.

Computing system 30 receives the digitized real and imaginary components from analog-digital converters 18a and 18b and may process the components according to known techniques. Such processing may, for example, include reconstructing two-dimensional or three-dimensional images by performing a Fourier transformation of raw k-space data, performing other image reconstruction techniques such as iterative or back-projection reconstruction techniques, applying filters to raw k-space data or to reconstructed images, generating functional magnetic resonance images, calculating motion or flow images, and generating a chemical shift vs. magnitude spectrum.

System 30 may comprise any general-purpose or dedicated computing system. Accordingly, system 30 includes one or more processing units 31 (e.g., processors, processor cores, execution threads, etc.) configured to execute processor-executable program code to cause system 30 to operate as described herein, and storage device 32 for storing the program code. Storage device 32 may comprise one or more fixed disks, solid-state random access memory, and/or removable media (e.g., a thumb drive) mounted in a corresponding interface (e.g., a USB port).

One or more processing units 31 may execute program code of control program 33 to provide instructions to sequence controller 10 via MR system interface 34. For example, sequence controller 10 may be instructed to initiate a desired pulse sequence of pulse sequences 37. In particular, sequence controller 10 may be instructed to control the switching of magnetic field gradients via amplifiers 8a-8c at appropriate times, the transmission of radio-frequency pulses having a specified phase and amplitude at specified times via RF system 11 and RF amplifier 12, and the readout of the resulting MR signals. The timing of the various pulses of a pulse sequence may be based on physiological data received by ECG monitor interface 36.

Storage device 32 stores MR images 38 generated as described herein. Such images may be provided to terminal 40 via terminal interface 35 of system 30. Terminal interface 35 may also receive input from terminal 40, which may be used to provide commands to control program 33 in order to acquire k-space data segments and generate images as described herein. Terminal 40 may comprise a display device and an input device coupled to system 30. In some embodiments, terminal 40 is a separate computing device such as, but not limited to, a desktop computer, a laptop computer, a tablet computer, and a smartphone.

Each element of system 1 may include other elements which are necessary for the operation thereof, as well as additional elements for providing functions other than those described herein. Storage device 32 may also store data and other program code for providing additional functionality and/or which are necessary for operation of system 30, such as device drivers, operating system files, etc.

Executable program code according to the above description may be stored on a form of non-transitory computer-readable media. Computer-readable media includes volatile and nonvolatile, removable, and non-removable media implemented in any method or technology for storage of information such as program code, data structures, program modules or other data. Computer-readable media includes, but is not limited to, random access memory (RAM), read-only memory (ROM), electrically erasable programmable ROM (EEPROM), flash memory or other memory technology, compact disk ROM (CD-ROM), digital volatile disks (DVD) or other optical storage, magnetic cassettes, magnetic tape, magnetic disk storage or other magnetic storage devices, or any other medium which can be used to store the desired instructions and which may be accessed by a system (e.g., a computer), including by internet or other computer network form of access.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A magnetic resonance imaging system comprising:
   a magnet system configured to generate a polarizing magnetic field about at least a portion of a subject;
   a plurality of gradient coils configured to apply at least one gradient field to the polarizing magnetic field;
   a radio frequency (RF) system configured to apply an excitation field to the subject and to acquire magnetic resonance (MR) data from the subject; and
   a processing unit to execute program code to cause the system to:
   acquire a plurality of navigator k-space data segments and a k-space data segment associated with each of the plurality of navigator k-space data segments;
   generate a respective navigator image from each of the plurality of navigator k-space data segments;
   based on the respective navigator images of each of the plurality of navigator k-space data segments, determine a first center navigator k-space data segment associated with a most common respiratory position of the subject;
   determine a center k-space data segment corresponding to the first center navigator k-space data segment;
   determine, for each non-center segment of k-space, a k-space data segment whose respective navigator image is most similar to a first center navigator image generated from the first center navigator k-space data segment; and
   generate an image based on the determined k-space data segments.

2. A system according to claim 1, wherein determination of the first center navigator k-space data segment associated with a most common respiratory position of the subject comprises:
   determination of a first composite navigator image based on the generated navigator images;
   determination of a difference image between each generated navigator image and the first composite navigator image;
   determination of a first value for each generated navigator image based on the difference image determined for the generated navigator image;
   assignment of the first values to a plurality of bins, each of the plurality of bins associated with a respective range of values;
   determination of a first bin to which a highest number of the first values is assigned;
   determination of a second composite navigator image based on the navigator images whose first values are assigned to the first bin;
   determination of a second difference image between each generated navigator image and the second composite navigator image;
   determination of a second value for each generated navigator image based on the second difference image determined for the generated navigator image;
   assignment of the second values to a second plurality of bins, each of the second plurality of bins associated with a respective range of values;
   determination of a second bin to which a highest number of the second values is assigned;
   determination of a center navigator image whose second value is assigned to the second bin; and determination of the first center navigator k-space data segment as associated with the center navigator image.

3. A system according to claim 2, wherein determination of a first value for each generated navigator image based on the difference image determined for the generated navigator image comprises summing of the absolute values of pixels of each difference image to determine a difference value for each generated navigator image, and
wherein determination of a second value for each generated navigator image based on the second difference image determined for the generated navigator image comprises summing of the absolute values of pixels of each second difference image to determine a second difference value for each generated navigator image.

4. A system according to claim 1, wherein determination of the first center navigator k-space data segment associated with a most common respiratory position of the subject comprises:
determination of a first composite navigator image based on the generated navigator images;
determination of a first displacement map between each generated navigator image and the first composite navigator image;
determination of a first displacement value for each generated navigator image based on the first displacement map determined for the generated navigator image;
assignment of the first displacement values to a plurality of bins, each of the plurality of bins associated with a respective range of displacement values;
determination of a first bin to which a highest number of the first displacement values is assigned;
determination of a second composite navigator image based on the navigator images whose first displacement values are assigned to the first bin;
determination of a second displacement map between each generated navigator image and the second composite navigator image;
determination of a second displacement value for each generated navigator image based on the second displacement map determined for the generated navigator image;
assignment of the second displacement values to a second plurality of bins, each of the second plurality of bins associated with a respective range of displacement values;
determination of a second bin to which a highest number of the second displacement values is assigned;
determination of a center navigator image whose second displacement value is assigned to the second bin; and
determination of the first center navigator k-space data segment as associated with the center navigator image.

5. A system according to claim 4, wherein determination of a first displacement value for each generated navigator image comprises:
determination of a first two-dimensional displacement vector for each generated navigator image based on the first displacement map determined for the generated navigator image; and
conversion of the first two-dimensional displacement vectors to one-dimensional first displacement values, and
determination of a second displacement value for each generated navigator image comprises:
determination of a second two-dimensional displacement vector for each generated navigator image based on the second displacement map determined for the generated navigator image; and
conversion of the second two-dimensional displacement vectors to one-dimensional second displacement values.

6. A system according to claim 5, wherein generation of an image based on the determined k-space data segments comprises:
determination of a displacement map between each respective navigator image most similar to the first center navigator image and the first center navigator image;
zero-filling of a respective k-space for each determined k-space data segment;
generation of a respective image from each zero-filled k-space;
application of motion correction to each respective image based on the displacement map determined between the respective navigator image and the first center navigator image; and
generation of the image based on the motion-corrected images.

7. A system according to claim 1, wherein generation of an image based on the determined k-space data segments comprises:
determination of a displacement map between each respective navigator image most similar to the first center navigator image and the first center navigator image;
zero-filling of a respective k-space for each determined k-space data segment;
generation of a respective image from each zero-filled k-space;
application of motion correction to each respective image based on the displacement map determined between the respective navigator image and the first center navigator image; and
generation of the image based on the motion-corrected images.

8. A method comprising:
determining a plurality of navigator k-space data segments acquired from a subject and a k-space data segment acquired from the subject and associated with each of the plurality of navigator k-space data segments;
generating a respective navigator image based on each of the plurality of navigator k-space data segments;
based on the respective navigator images of each of the plurality of navigator k-space data segments, determining a first center navigator k-space data segment associated with a first respiratory position of the subject;
determining a center k-space data segment corresponding to the first center navigator k-space data segment;
determining, for each non-center segment of k-space, a k-space data segment whose respective navigator image is most similar to a first center navigator image generated from the first center navigator k-space data segment; and
generating an image based on the determined k-space data segments.

9. A method according to claim 8, wherein determining the first center navigator k-space data segment associated with a most common respiratory position of the subject comprises:
determining a first composite navigator image based on the generated navigator images;
determining a difference image between each generated navigator image and the first composite navigator image;

determining a first value for each generated navigator image based on the difference image determined for the generated navigator image;

assigning the first values to a plurality of bins, each of the plurality of bins associated with a respective range of values;

determining a first bin to which a highest number of the first values is assigned;

determining a second composite navigator image based on the navigator images whose first values are assigned to the first bin;

determining a second difference image between each generated navigator image and the second composite navigator image;

determining a second value for each generated navigator image based on the second difference image determined for the generated navigator image;

assigning the second values to a second plurality of bins, each of the second plurality of bins associated with a respective range of values;

determining a second bin to which a highest number of the second values is assigned;

determining a center navigator image whose second value is assigned to the second bin; and determining the first center navigator k-space data segment as associated with the center navigator image.

10. A method according to claim 9, wherein determining a first value for each generated navigator image based on the difference image determined for the generated navigator image comprises summing the absolute values of pixels of each difference image to determine a difference value for each generated navigator image, and wherein determining a second value for each generated navigator image based on the second difference image determined for the generated navigator image comprises summing the absolute values of pixels of each second difference image to determine a second difference value for each generated navigator image.

11. A method according to claim 8, wherein determining the first center navigator k-space data segment associated with a most common respiratory position of the subject comprises:

determining a first composite navigator image based on the generated navigator images;

determining a first displacement map between each generated navigator image and the first composite navigator image;

determining a first displacement value for each generated navigator image based on the first displacement map determined for the generated navigator image;

assigning the first displacement values to a plurality of bins, each of the plurality of bins associated with a respective range of displacement values;

determining a first bin to which a highest number of the first displacement values is assigned;

determining a second composite navigator image based on the navigator images whose first displacement values are assigned to the first bin;

determining a second displacement map between each generated navigator image and the second composite navigator image;

determining a second displacement value for each generated navigator image based on the second displacement map determined for the generated navigator image;

assigning the second displacement values to a second plurality of bins, each of the second plurality of bins associated with a respective range of displacement values;

determining a second bin to which a highest number of the second displacement values is assigned;

determining a center navigator image whose second displacement value is assigned to the second bin; and determining the first center navigator k-space data segment as associated with the center navigator image.

12. A method according to claim 11, wherein determining a first displacement value for each generated navigator image comprises:

determining a first two-dimensional displacement vector for each generated navigator image based on the first displacement map determined for the generated navigator image; and converting of the first two-dimensional displacement vectors to one-dimensional first displacement values, and determining a second displacement value for each generated navigator image comprises:

determining a second two-dimensional displacement vector for each generated navigator image based on the second displacement map determined for the generated navigator image; and converting the second two-dimensional displacement vectors to one-dimensional second displacement values.

13. A method according to claim 12, wherein generating an image based on the determined k-space data segments comprises:

determining a displacement map between each respective navigator image most similar to the first center navigator image and the first center navigator image;

zero-filling a respective k-space for each determined k-space data segment;

generating a respective image from each zero-filled k-space;

applying motion correction to each respective image based on the displacement map determined between the respective navigator image and the first center navigator image; and generating the image based on the motion-corrected images.

14. A method according to claim 8, wherein generating an image based on the determined k-space data segments comprises:

determining a displacement map between each respective navigator image most similar to the first center navigator image and the first center navigator image;

zero-filling a respective k-space for each determined k-space data segment;

generating a respective image from each zero-filled k-space;

applying motion correction to each respective image based on the displacement map determined between the respective navigator image and the first center navigator image; and generating the image based on the motion-corrected images.

15. A non-transitory computer-readable medium storing program code executable by one or more processing units to cause a computing system to:

acquire, from a subject, a plurality of navigator k-space data segments and a k-space data segment associated with each of the plurality of navigator k-space data segments;

generate a respective navigator image from each of the plurality of navigator k-space data segments;

based on the respective navigator images of each of the plurality of navigator k-space data segments, determine a first center navigator k-space data segment associated with a most common respiratory position of the subject;

determine a center k-space data segment corresponding to the first center navigator k-space data segment;

determine, for each non-center segment of k-space, a k-space data segment whose respective navigator image is most similar to a first center navigator image generated from the first center navigator k-space data segment; and generate an image based on the determined k-space data segments.

16. A medium according to claim 15, wherein determination of the first center navigator k-space data segment associated with a most common respiratory position of the subject comprises:

determination of a first composite navigator image based on the generated navigator images;

determination of a difference image between each generated navigator image and the first composite navigator image;

determination of a first value for each generated navigator image based on the difference image determined for the generated navigator image;

assignment of the first values to a plurality of bins, each of the plurality of bins associated with a respective range of values;

determination of a first bin to which a highest number of the first values is assigned;

determination of a second composite navigator image based on the navigator images whose first values are assigned to the first bin;

determination of a second difference image between each generated navigator image and the second composite navigator image;

determination of a second value for each generated navigator image based on the second difference image determined for the generated navigator image;

assignment of the second values to a second plurality of bins, each of the second plurality of bins associated with a respective range of values;

determination of a second bin to which a highest number of the second values is assigned;

determination of a center navigator image whose second value is assigned to the second bin; and determination of the first center navigator k-space data segment as associated with the center navigator image.

17. A medium according to claim 15, wherein determination of the first center navigator k-space data segment associated with a most common respiratory position of the subject comprises:

determination of a first composite navigator image based on the generated navigator images;

determination of a first displacement map between each generated navigator image and the first composite navigator image;

determination of a first displacement value for each generated navigator image based on the first displacement map determined for the generated navigator image;

assignment of the first displacement values to a plurality of bins, each of the plurality of bins associated with a respective range of displacement values;

determination of a first bin to which a highest number of the first displacement values is assigned;

determination of a second composite navigator image based on the navigator images whose first displacement values are assigned to the first bin;

determination of a second displacement map between each generated navigator image and the second composite navigator image;

determination of a second displacement value for each generated navigator image based on the second displacement map determined for the generated navigator image;

assignment of the second displacement values to a second plurality of bins, each of the second plurality of bins associated with a respective range of displacement values;

determination of a second bin to which a highest number of the second displacement values is assigned;

determination of a center navigator image whose second displacement value is assigned to the second bin; and determination of the first center navigator k-space data segment as associated with the center navigator image.

18. A medium according to claim 17, wherein determination of a first displacement value for each generated navigator image comprises:

determination of a first two-dimensional displacement vector for each generated navigator image based on the first displacement map determined for the generated navigator image; and conversion of the first two-dimensional displacement vectors to one-dimensional first displacement values, and determination of a second displacement value for each generated navigator image comprises:

determination of a second two-dimensional displacement vector for each generated navigator image based on the second displacement map determined for the generated navigator image; and conversion of the second two-dimensional displacement vectors to one-dimensional second displacement values.

19. A medium according to claim 18, wherein generation of an image based on the determined k-space data segments comprises:

determination of a displacement map between each respective navigator image most similar to the first center navigator image and the first center navigator image;

zero-filling of a respective k-space for each determined k-space data segment;

generation of a respective image from each zero-filled k-space;

application of motion correction to each respective image based on the displacement map determined between the respective navigator image and the first center navigator image; and generation of the image based on the motion-corrected images.

20. A medium according to claim 15, wherein generation of an image based on the determined k-space data segments comprises:

determination of a displacement map between each respective navigator image most similar to the first center navigator image and the first center navigator image;

zero-filling of a respective k-space for each determined k-space data segment;

generation of a respective image from each zero-filled k-space;
application of motion correction to each respective image based on the displacement map determined between the respective navigator image and the first center navigator image; and
generation of the image based on the motion-corrected images.

* * * * *